United States Patent [19]

Makita et al.

[11] Patent Number: 5,001,664

[45] Date of Patent: Mar. 19, 1991

[54] DIVIDING CIRCUIT CALCULATING A QUOTIENT OF K M-ARY DIGITS IN K MACHINE CYCLES

[75] Inventors: Akihisa Makita, Tokyo; Hiroshi Sakurai, Yamanashi, both of Japan

[73] Assignee: NEC Corporation, Tokyo, Japan

[21] Appl. No.: 419,275

[22] Filed: Oct. 10, 1989

[30] Foreign Application Priority Data

Oct. 8, 1988 [JP] Japan .................. 63-252905

[51] Int. Cl.⁵ .............................................. G06F 7/38
[52] U.S. Cl. .................................................. 364/761
[58] Field of Search ...................... 364/746.2, 761–767

[56] References Cited

U.S. PATENT DOCUMENTS

| | | | |
|---|---|---|---|
| 4,635,220 | 1/1987 | Yabe et al. | 364/763 |
| 4,707,798 | 11/1987 | Nakano | 364/765 |
| 4,725,974 | 2/1988 | Kanazawa | 364/765 |
| 4,949,295 | 8/1990 | Stearns | 364/761 |

Primary Examiner—Dale M. Shaw
Attorney, Agent, or Firm—Foley & Lardner, Schwartz, Jeffery, Schwaab, Mack, Blumenthal & Evans

[57] ABSTRACT

For dividing a dividend of a first plurality of m-ary digits by a divisor of a second plurality of m-ary digits to provide a certain number K of m-ary quotient digits, where m represents $2^N$, a shift register comprises a most significant part, first and second higher parts for the second plurality less one of m-ary digits and one m-ary digit, and a least significant stage and holds an instantaneous content which is used as a current content during a last part of a preceding one of two consecutive machine cycles and is first a concatenation of an m-ary zero digit and the dividend m-ary digits. A carry save adder tree calculates a set of zeroth to $(m-1)$-th algebraic sums of a part of the current content held in the most significant and the first and the second higher parts minus zero through $(m-1)$ times the divisor, respectively, plus a carry from a previous machine cycle. The sums are used in deciding a partial quotient of one m-ary digit and a sum datum of the second plurality of m-ary digits. In a leading part of a succeeding one of the consecutive machine cycles, the partial quotient and the sum datum are stored in the least significant stage and the most significant and the first higher parts. After lapse of K machine cycles, the shift register is loaded with an eventual quotient in its stages other than the most significant and the first and the second higher parts.

6 Claims, 3 Drawing Sheets

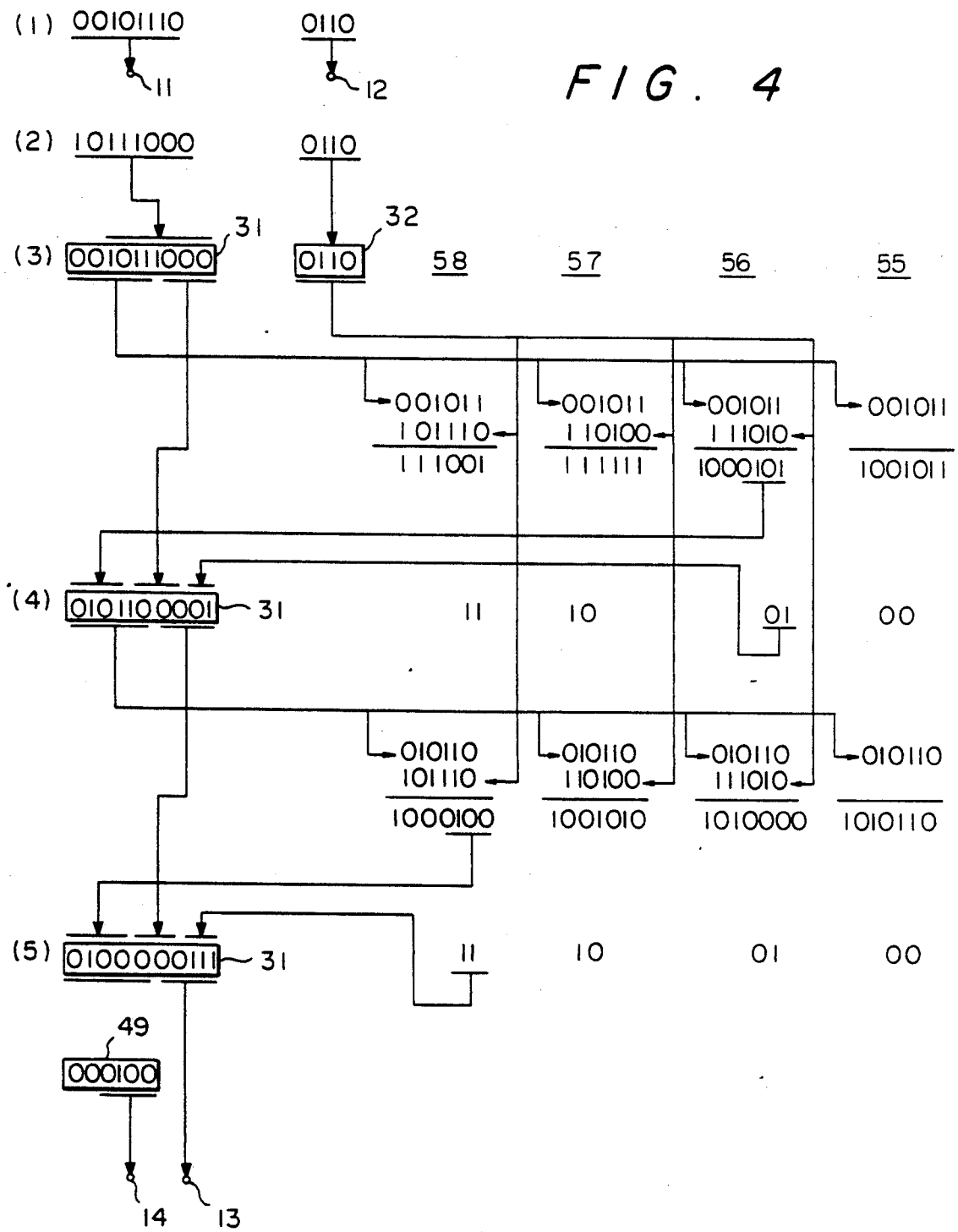

DIVIDING CIRCUIT CALCULATING A QUOTIENT OF K M-ARY DIGITS IN K MACHINE CYCLES

BACKGROUND OF THE INVENTION

This invention relates to a dividing circuit for dividing a dividend of a plurality of m-ary digits by a divisor of at least one m-ary digit, where m represents $2^N$, where N represents, in turn, a predetermined decimal integer which is not less than one. Each m-ary digit of the dividend and the divisor is therefore a binary, a quaternary, an octonary, a hexadecimal, or a like digit. More particularly, the dividing circuit is for calculating a quotient together with a residue. In connection with this invention, it should be noted that each of the dividend and the quotient can be said to consist of a plurality of m-ary digits without loss of generality.

Such a dividing circuit is useful in many fields of application, such as in an electronic digital computer. More specifically, the dividing circuit is a fixed-point dividing circuit according to this invention.

In the manner which will later be described with reference to one of a few drawing figures of the accompanying drawing, many machine cycles are necessary on calculating the quotient by a conventional dividing circuit. An improved dividing circuit is disclosed in U.S. Pat. No. 4,725,974 issued to Takashi Kanazawa. The improved dividing circuit is capable of achieving a high throughput. However, the improved dividing circuit comprises a great amount of hardware.

SUMMARY OF THE INVENTION

It is therefore an object of the present invention to provide a dividing circuit capable of calculating a quotient of a certain number K of $2^N$-ary digits in K machine cycles.

It is another object of this invention to provide a dividing circuit of the type described, which comprises a least possible amount of hardware.

Other objects of this invention will become clear as the description proceeds.

On describing the gist of this invention, it is possible to understand that a dividing circuit is for dividing a dividend of a first plurality of m-ary digits by a divisor of a second plurality of m-ary digits, where m represents $2^N$ and where N represents a predetermined decimal integer which is not less than one.

According to this invention, the above-understood dividing circuit comprises: (a) a digit aligner for aligning the m-ary digits of the dividend and the divisor to produce a modified dividend and a modified divisor with their most significant digits aligned; (b) a shift register including a most significant part for one m-ary digit, a first higher part of the second plurality less one of m-ary digits, a second higher part for one m-ary digit, and a least significant part for one m-ary digit for holding an instantaneous content of one plus the first plurality of m-ary digits, the most significant and the first and the second higher parts being for holding an upper part of the instantaneous content, the instantaneous content being a current content during a last period of a preceding one of two consecutive machine cycles, the shift register except for the most significant part being connected to the digit aligner to hold a concatenation of an m-ary zero digit and the modified dividend as the current content on starting operation of the dividing circuit; (c) a carry register for memorizing a memorized carry; (d) sum calculating means connected to the digit aligner, the most significant and the first and the second higher parts, and the carry register for calculating a set of algebraic sums of the upper part of the current content minus products of the modified divisor and m-ary one-digit numbers plus the memorized carry; (d) a decision circuit connected to the calculating means for using the set of algebraic sums in deciding a partial quotient of one m-ary digit and a sum datum of the second plurality of m-ary digits in a leading period of a suceeding one of the two consecutive machine cycles; (f) shifting means connected to the shift register for shifting the current content towards its most significant digit one m-ary digit to make the shift register hold a shifted content as the instantaneous content when the preceding one of the two consecutive machine cycles proceeds to the succeeding one of the two consecutive machine cycles; and (g) updating means connected to the most significant, the first higher, and the least significant parts and the decision circuit for updating the shifted content into an updated content with the sum datum and the partial quotient substituted for parts of the shifted content which are held in the most significant and the first higher parts and in the least significant part, respectively, the updated content serving as the current content during the last period of the succeeding one of the two consecutive machine cycles.

BRIEF DESCRIPTION OF THE DRAWING

FIG. 4 is a representation for use in describing operation of the dividing circuit illustrated in FIG. 2.

DESCRIPTION OF THE PREFERRED EMBODIMENT

Figure 1:
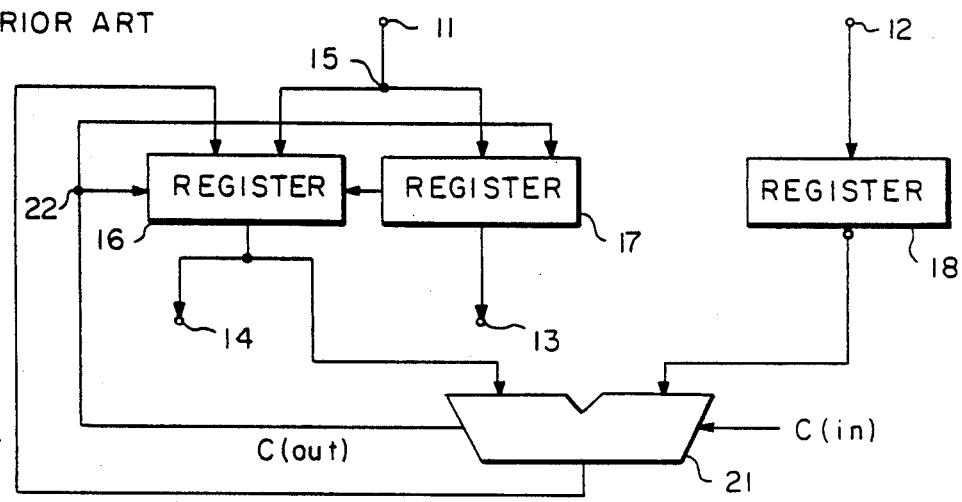
FIG. 1 is a block diagram of a conventional dividing circuit.

Referring to FIG. 1, a conventional dividing circuit will be described at first in order to facilitate an understanding of the present invention. The dividing circuit is for dividing an m-ary dividend by an m-ary divisor to calculate a quotient together with a residue and has a dividend input terminal 11, a divisor input terminal 12, a quotient output terminal 13, and a residue output terminal 14.

The following facts should be understood throughout the instant specification. It is possible to say without loss of generality that the dividend consists of a first plurality of m-ary digits, that the divisor consists of a second plurality of m-ary digits, and that the quotient consists of a quotient digit number K of m-ary digits. Each m-ary digit is a binary, a quaternary, an octonary, a hexadecimal, or a like digit. More precisely, m represents $2^N$, where N represents a predetermined decimal integer which is not less than one.

In the example being illustrated, the dividend input terminal 11 is supplied with a dividend signal representing the dividend as a plurality of dividend bits, Dd in number. The divisor input terminal 12 is supplied with a divisor signal which represents the divisor as a plurality of divisor bits, Ds in number. The dividend bits are separated at 15 into an upper and a lower part. The upper part consists of Ds dividend bits.

The upper part is stored in a first register 16 and the lower part, in a second register 17. The divisor bits are stored in a third register 18. It will be seen that a short arrow is drawn from the second register 17 to the first register 16. This arrow shows that the first and the second registers 16 and 17 are collectively operable as a shift register for holding a content of binary digits wherein the binary digits are one bit shifted leftwardly of the figure by each of shift pulses which are positioned in a shift pulse sequence at time instants defined by successive machine cycles.

In each machine cycle, the first register 16 simultaneously produces the bits held therein. The third register 18 always produces inverted divisor bits in bit parallel. The inverted divisor bits are collectively representative of a complement of the divisor.

An adder 21 is for first and second Ds-bit adder inputs. The first adder input is supplied from the first register 16 and the second adder input, from the third register 18. The adder 21 is supplied furthermore with a complement bit C(in) of a binary one bit. Supplied with the complement of the divisor and the binary one complement bit, the adder 21 subtracts the divisor from the upper part of the dividend bits at first to produce a difference consisting of a carry output C(out) and an algebraic sum of one bit.

Immediately before the adder 21 produces such an algebraic sum, the bits are shifted in the first and the second registers 16 and 17. The upper part becomes a new upper part with its least significant bit shifted from the second register 17 into the first register 16. The lower part has its most significant bit shifted from the second register 17 to the first register 16 as the least significant bit of the new upper part. The lower part thereby becomes a new lower part.

In the meantime, the carry output is checked at 22 whether the carry output is a binary one or a binary zero bit. If the carry output is the binary one bit, the algebraic sum is positive. The sum is substituted in the first register 16 for the least significant bit of the new upper part. The carry output is substituted in the second register 17 for the least significant bit of the new lower part. If the carry output is the binary zero bit, the algebraic sum is negative. In this event, the first and the second registers 16 and 17 are kept untouched. That is, the new upper and lower parts are kept in the first and the second registers 16 and 17 as they are.

In this manner, the dividend is processed bit by bit until the lower part of the dividend is completely shifted from the second register 17 into the first register 16. At this time instant, the second register 17 is loaded with the quotient consisting of K bits. The first register 16 is loaded with the residue. It is now understood that $2^K$ machine cycles are necessary on calculating the quotient by the conventional dividing circuit.

Figure 2:
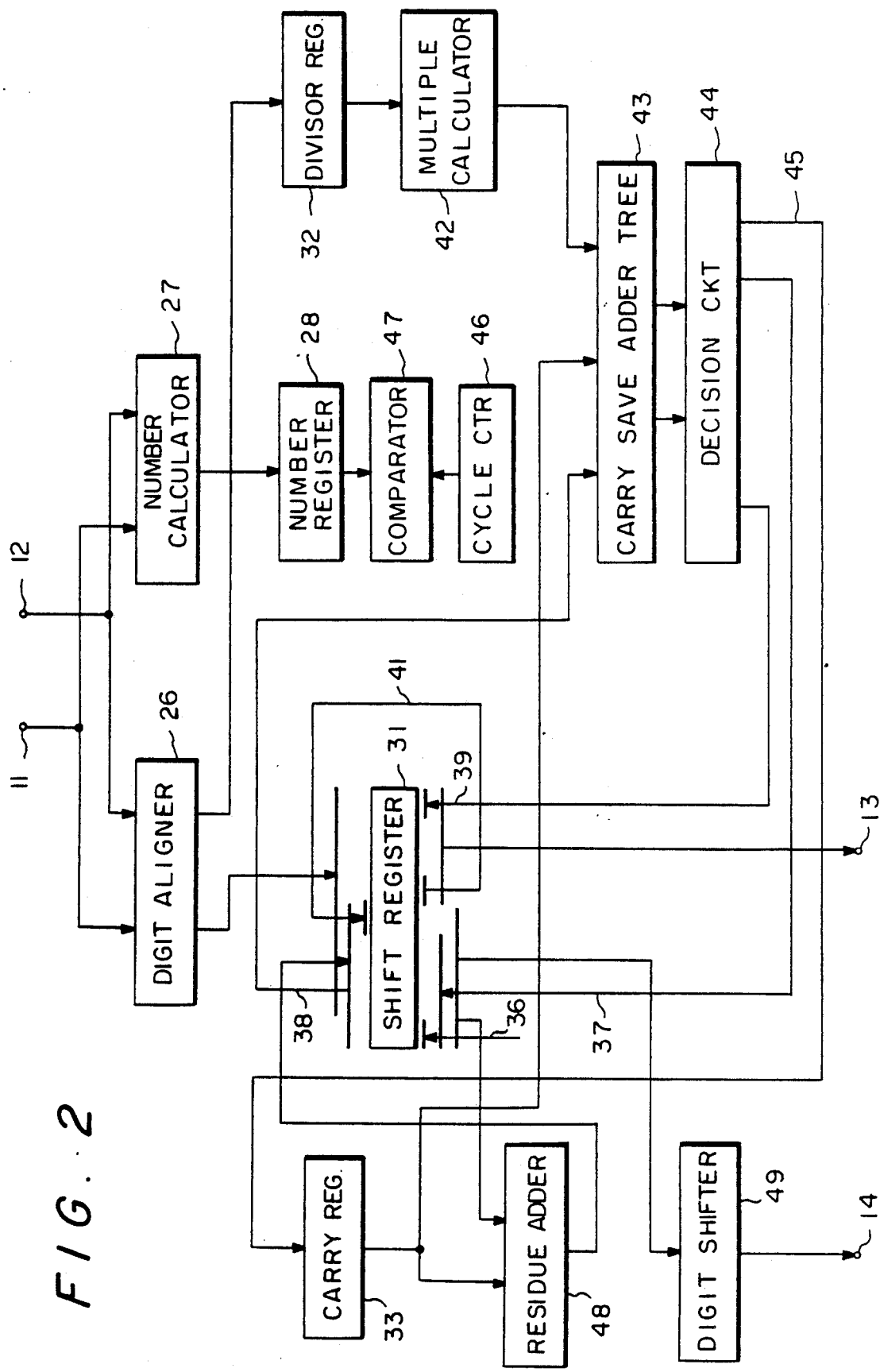
FIG. 2 is a block diagram of a dividing circuit according to an embodiment of the instant invention.

Referring now to FIG. 2, the description will proceed to a dividing circuit according to a preferred embodiment of this invention. According to this invention, the dividing circuit mostly comprises m-ary circuit elements and only partly comprises binary circuit elements. It is possible to implement each m-ary circuit element by a binary, a quaternary, or a like circuit element.

In FIG. 2, the dividing circuit has a dividend input terminal 11, a divisor input terminal 12, a quotient output terminal 13, and a residue output terminal 14. Although designated by like reference numerals, the dividend input terminal 11 is supplied with a dividend signal representative of the m-ary dividend. The divisor input terminal 12 is supplied with a divisor signal representative of the m-ary divisor. That is, the dividend input terminal 11 is supplied with the first plurality of m-ary dividend digits as they stand. The divisor input terminal 12 is supplied with the second plurality of m-ary divisor digits. Only when the dividing circuit is wholly implemented by binary circuit elements, each of the dividend and the divisor is preferably represented by a binary signal. Incidentally, the quotient and the residue will be called an eventual quotient and an eventual residue for the reason which will become clear later.

The dividend and the divisor signals are delivered to an m-ary digit aligner 26 and to a quotient digit number calculator 27. The digit number calculator 27 calculates a dividend digit number Dd of the m-ary dividend digits and a divisor digit number Ds of the m-ary divisor digits and then a quotient digit number K of m-ary digits of the eventual quotient. The quotient digit number is stored in a number register 28.

The digit aligner 26 is for aligning the m-ary digits of the dividend and the divisor to produce a modified dividend and a modified divisor with their most significant digits aligned. The modified dividend is stored in a shift register 31 in the manner which will later be described. The modified divisor is stored in a divisor register 32. In the manner which will become clear as the description proceeds, a carry register 33 memorizes a memorized carry.

The shift register 31 has a plurality of shift register stages, each for one m-ary digit. More particularly, the shift register 31 comprises a most significant part or stage indicated by a first connection 36, a first higher part indicated by a second connection 37 together with the most significant part, a second higher part indicated by a third connection 38 together with the most significant and the first higher parts, a least significant part or stage indicated by a fourth connection 39, and a lower part which includes the least significant part and is the shift register stages except for a combination of the most significant and the first and the second higher parts. The most significant, the first and the second higher, and the lower parts are continuous in the shift register 31.

Each of the most and the least significant and the second higher parts is for one m-ary digit. The first higher part is for the second plurality less one of m-ary digits. It should be noted that the expression "second plurality" refers to the divisor digit number Ds and does not mean the m-ary divisor digits. This applies to the expression "first plurality", which expression means the dividend digit number Dd rather than the m-ary dividend digits.

The shift register 31, namely, a succession of the most significant, the first and the second higher, and the lower parts, is for holding an instantaneous content. A combination of the most significant and the first and the second higher parts is for holding an upper part of the instantaneous content. The lower part is for holding a lower part of the instantaneous content. Merely for simplicity of the description, it will be assumed that the instantaneous content consists of one m-ary digit and the first plurality of m-ary digits.

Such one plus the first plurality of digits are shifted one m-ary digit towards its most significant digit by each of shift pulses which are located in a shift pulse sequence at time instants defined by successive machine cycles. Inasmuch as the shift register 31 holds its content shifted in this manner from time to time, the shift register 31 is herein said to hold the instantaneous content as a current content during a last period or part of a preceding one of two consecutive machine cycles. The shift register 31 is said to hold the instantaneous content as a shifted content during a leading period or part of a succeeding one of the two consecutive machine cycles.

A shifting arrangement is therefore connected to the shift register 31 to shift the current content towards its most significant digit one m-ary digit per machine cycle to make the shift register 31 hold the shifted content. It is possible to understand that the shifting arrangement is depicted by a line 41 which will presently be described a little more in detail.

When the current content is shifted into the shifted content, a most significant digit of the lower part of the current content is shifted into the second higher part of the shift register 31 as a least significant digit of the upper part of the shifted content. The line 41 indicates this fact.

The first and the second higher and the lower parts are connected to the digit aligner 26. Upon start of operation of the dividing circuit, the instantaneous content is an initial content which is a concatenation of an m-ary zero digit and the modified dividend and is used as the current content during the last period of a first machine cycle of start of operation. Namely, the zero digit is stored in the most significant part of the shift register 31 through the first connection 36 when the modified dividend is stored in the first and the second higher and the lower parts of the shift register 31 from the digit aligner 26. The carry register 33 is supplied with an m-ary zero digit upon start of operation.

The modified divisor is delivered from the divisor register 32 to a multiple generator 42 for producing, as generator outputs, the modified divisor and minus $2^n$ times the modified divisor, where n is variable between zero and the predetermined decimal integer, both inclusive. As produced, the modified divisor is identical with one times the modified divisor memorized in the divisor register 32. It is now readily possible to obtain products of the modified divisor and m-ary one-digit numbers, namely, zero through $(2^N-1)$, from the generator outputs.

A carry save adder tree 43 is supplied with the upper part of the current content from the shift register 31 through the third connection 38 within each machine cycle, always with the outputs from the multiple generator 42, and with the memorized carry from the carry register 33 within each machine cycle and calculates a set of algebraic sums, m in number, of the upper part of the current content minus the products plus the memorized carry. Each algebraic sum has either a positive (plus) or a negative (minus) sign. In the manner which will later be described, the adder tree 43 comprises zeroth through $(2^N-1)$-th or (m−1)-th carry save adder branches for producing the algebraic sums of each set, respectively.

From the adder tree 43, a decision circuit 44 is supplied with each set of the algebraic sums together with their signs. Using the algebraic sums and the signs, the decision circuit 44 decides a partial quotient of one m-ary digit, a carry datum of one m-ary digit, and a sum datum of the second plurality of m-ary digits in the leading period of the succeeding one of the two consecutive machine cycles.

To this end, the decision circuit 44 searches for an algebraic sum among each set of the algebraic sums that has the positive sign as a positive sum. The positive sum is produced by at least one of the adder branches that always comprises the zeroth adder branch. When only one positive sum is produced by the zeroth adder branch, the decision circuit 44 decides that the partial quotient is equal to m-ary zero. When two positive sums are produced by the zeroth and the first adder branches, the partial quotient is equal to m-ary one. In this manner, the partial quotient is equal to m-ary (m−1) when m positive sums are produced by all adder branches, m in number.

The decision circuit 44 selects the carry datum and the sum datum from the positive sum produced by one of the adder branches that is used in deciding the partial quotient. Such a decision circuit 44 will later be described a little more in detail.

As soon as the current content is shifted into the shifted content, the partial quotient is stored in the shift register 31 at the least significant part through the fourth connection 39. The sum datum is stored in the most significant and the first higher parts through the second connection 37. In this manner, the shifted content is updated into an updated content in the leading period of the succeeding one of the two consecutive machine cycles. The updated content is used as the current content during the last period of the succeeding one of the two consecutive machine cycles. Through an additional connection 45, the carry datum is stored in the carry register 33 afresh as the memorized carry.

It is now understood that a combination of the divisor register 32, the multiple generator 42, and the carry save adder tree 43 serves as a sum calculating unit connected to the digit aligner 26, the most significant and the first and the second higher parts of the shift register 31, and the carry register 33 for calculating each set of the algebraic sums. The connections 37 and 39 are collectively used as an updating arrangement connected to the most significant, the first higher, and the least significant parts of the shift register 31 and to the decision circuit 44 for updating the shifted content into the updated content during the leading period of the succeeding one of the two consecutive machine cycles.

In FIG. 2, the dividing circuit comprises a cycle counter 46 supplied with the shift pulse sequence for counting a cycle number of the successive machine cycles from the start of operation of the dividing circuit. Connected to the number register 28 and the cycle counter 46, a comparator 47 detects an end time instant at which the operation comes to an end, namely, at which the eventual quotient is obtained. It should be noted that a combination of the digit number calculator 27 and the number register 28 serves as a digit number calculating unit supplied with the dividend and the divisor from the dividend and the divisor input terminals 11 and 12 for calculating the quotient digit number K.

During the successive machine cycles, the partial quotients are successively stored in the lower part of the shift register 31. As a result, the shift register 31 holds the updated content as an eventual content when the end time instant is detected. At this time instant, the lower part of the eventual content is delivered to the quotient output terminal 13 as the eventual quotient. It is therefore appreciated that the quotient output terminal 14 serves as a quotient producing unit connected to the lower part of the shift register 31 and coupled to the digit number calculating unit for producing the eventual quotient when the successive machine cycles become equal in number to the quotient digit number K.

A residue adder 48 is connected to the carry register 33 and the most significant and the first and the second higher parts of the shift register 31 and coupled to the digit number calculating unit. As soon as the end time instant is detected, the residue adder 48 calculates a sum of the memorized carry and the upper part of the eventual content to produce a provisional residue.

In the example being illustrated, the provisional residue is substituted in the shift register 31 for the upper part of the eventual content as a memorized residue. A digit shifter 49 is connected to the most significant and the first and the second higher parts of the shift register 31 for one m-ary digit shifting the memorized residue towards its least significant digit. The digit shifter 49 thereby delivers the eventual residue to the residue output terminal 14.

Figure 3:
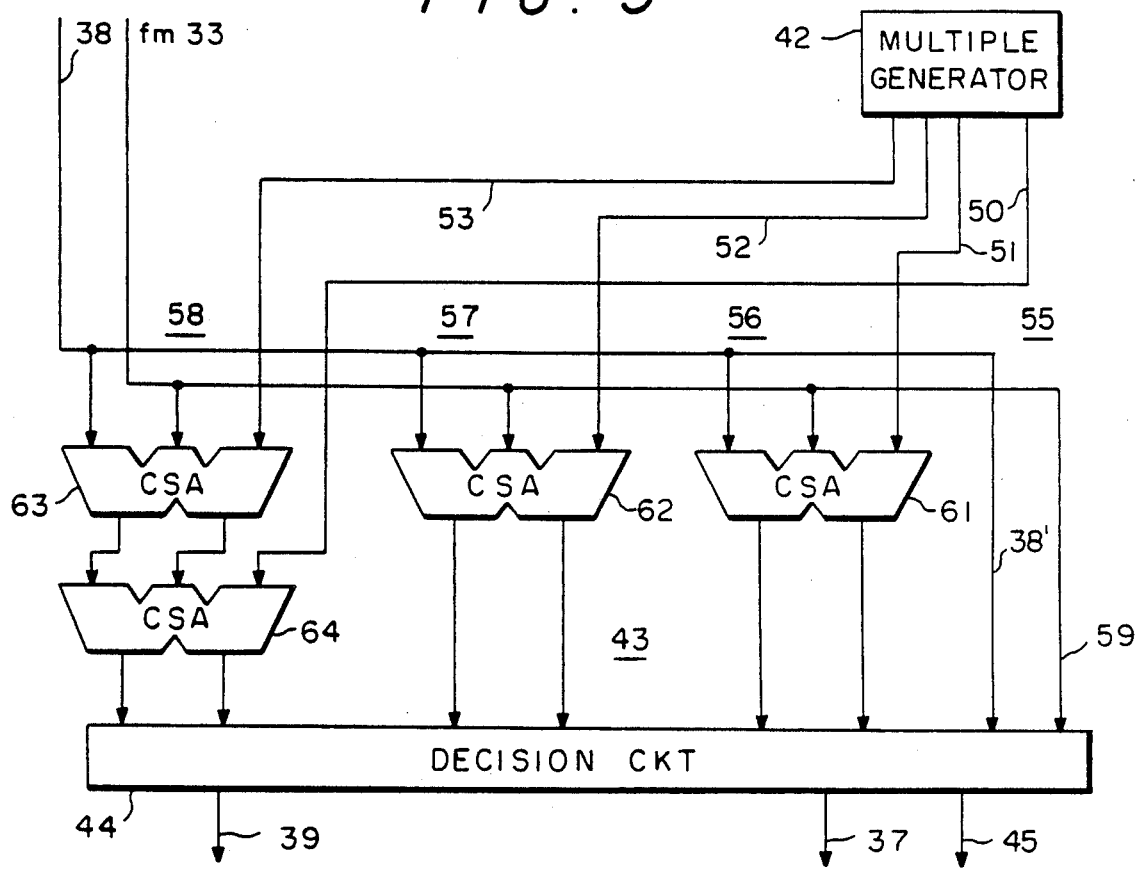
FIG. 3 is a detailed block diagram of a part of the dividing circuit depicted in FIG. 2.

Referring to FIGS. 3 and 4, attention will be directed to the carry save adder tree 43 and the decision circuit 44 and to operation of the dividing circuit illustrated with reference to FIG. 2. It will be presumed merely for brevity of the description that the m-ary digits are quaternary digits, namely, that the predetermined decimal integer is equal to two.

In FIG. 3, the multiple generator 42 is depicted to produce the modified divisor, minus one times the modified divisor, minus two times the modified divisor, and minus three times the modified divisor to zeroth through third leads 50, 51, 52, and 53, respectively. The carry save adder tree 43 comprises zeroth through third carry save adder branches 55, 56, 57, and 58.

The zeroth adder branch 55 comprises extensions 38' and 59 of the third connection 38 and a connection extended from the carry register 33. The first adder branch 56 comprises a first carry save adder 61 connected to the third connection 38, the carry register 33, and the first lead 51. The first carry save adder 61 produces a first carry datum of one quaternary digit, a first sum datum of the second plurality of quaternary digits, and a first carry output of one bit. The second adder branch 57 comprises a second carry save adder 62 connected to the third connection 38, the carry register 33, and the second lead 52 to produce a second carry datum and a second sum datum together with a second carry output. The third adder branch 58 comprises a third carry save adder 63 connected to the third connection 38, the carry register 33, and the third lead 53 to produce an intermediate carry datum and an intermediate sum datum together with an intermediate carry output. The third adder branch 58 further comprises an additional carry save adder 64 supplied with the intermediate carry and sum data together with the intermediate carry output to produce a third carry datum and a third sum datum together with a third carry output.

Through the zeroth carry save adder branch 55, the upper part of the current content is used as a zeroth sum datum. The memorised carry is used as a zeroth carry datum. The zeroth carry and sum data are used as a zeroth algebraic sum, which is understood to have the positive sign. The first carry and sum data are used as a first algebraic sum together with the first carry output. In this manner, the seond and the third carry save adder branches 57 and 58 produce second and third algebraic sums.

In FIG. 3, the decision circuit 44 is supplied with the zeroth through the third algebraic sums. By using the first through the third carry outputs, the decision circuit 44 searches for the positive sum or sums and supplies the partial quotient to the fourth connection 39. The partial quotient can readily be decided as by using a read-only memory to which the first through the third carry outputs are delivered collectively as an address signal.

In FIG. 4, it is furthermore presumed that the first plurality is equal to four and that the second plurality is equal to two. The quaternary digits are represented by bits. Along a top or first row labelled (1), the dividend and the divisor are exemplified as supplied to the dividend and the divisor input terminals 11 and 12. Along a second row labelled (2), the modified dividend and the modified divisor are depicted.

In the manner depicted along a third row labelled (3), the initial content is held in the shift register 31 during the first machine cycle. The modified divisor is kept in the divisor register 32 throughout the successive machine cycles. The zeroth through the third carry save adder branches are indicated at 55 through 58. As depicted below the third row, the first carry output shows that the first algebraic sum is positive in addition to the zeroth algebraic sum. The partial quotient is therefore decided to be equal to quaternary one. The decision circuit 44 selects the first carry and the sum data.

In the manner depicted along a fourth row labelled (4), the first sum datum is used in the shift register 31 in the second machine cycle as the upper part of the updated content. The first carry datum is used in the carry register 33 as the memorized carry. As depicted below the fourth row, the zeroth through the third carry save adder branches 55 to 58 produce positive sums. The partial quotient is therefore decided to be equal to quaternary three. The decision circuit 44 selects the third carry and sum data.

In the manner depicted along a fifth row labelled (5), the third sum datum is used in the shift register 31 as the upper part of the updated content in the third machine cycle which is two machine cycles later than the first machine cycle. Inasmuch as the quotient digit number K is equal to two, the updated content becomes the eventual content. As depicted below the fifth row, the lower part of the eventual content is delivered to the quotient output terminal 13 as the eventual quotient. The third carry datum is equal to zero. The residue adder 48 therefore does not vary the upper part of the eventual content. It will be seen below the fifth row that the digit shifter 49 delivers the eventual residue to the residue output terminal 14.

While this invention has thus far been described in specific conjunction with a single embodiment thereof, it will now be readily possible for one skilled in the art to carry this invention into effect in various other manners. For example, the modified dividend and the modified divisor can be stored in the shift register 31 and the divisor register 32 with reference to the dividend and the divisor digit numbers Dd and Ds calculated by the digit number calculator 26. The shift register 31 can therefore memorize the modified dividend of various lengths. The provisional residue can directly be delivered from the residue adder 48 to the digit shifter 49. Finally, it should be understood that each of the most significant m-ary dividend and divisor digits is an effective one.

What is claimed is:

1. A dividing circuit for dividing a dividend of a first plurality of m-ary digits by a devisor of a second plurality of m-ary digits, where m represents $2^N$ and where N represents a predetermined decimal integer which is not less than one, said dividing circuit comprising:

a digit aligner for aligning the m-ary digits of said dividend and said divisor to produce a modified dividend and a modified divisor with their most significant digits aligned;

a shift register including a most significant part for one m-ary digit, a first higher part for said second plurality less one of m-ary digits, a second higher part for one m-ary digit, and a least significant part for one m-ary digit for holding an instantaneous content of one plus said first plurality of m-ary digits, said most significant and said first and said second higher parts being for holding an upper part of said instantaneous content, said instantaneous content being a current content during a last period of a preceding one of two consecutive machine cycles, said shift register except for said most significant part being connected to said digit aligner to hold a concatenation of an m-ary zero digit and said modified dividend as said current content on starting operation of said divding circuit;

a carry register for memorizing a memorized carry;

sum calculating means connected to said digit aligner, said most significant and said first and said second higher parts, and said carry register for calculating a set of algebraic sums of the upper part of said current content minus products of said modified divisor and m-ary one-digit numbers plus said memorized carry;

a decision circuit connected to said calculating means for using said set of algebraic sums in deciding a partial quotient of one m-ary digit and a sum datum of said second plurality of m-ary digits in a leading period of a succeeding one of said two consecutive machine cycles;

shifting means connected to said shift register for shifting said current content towards its most significant digit one m-ary digit to make said shift register hold a shifted content as said instantaneous content when said preceding one of the two consecutive machine cycles proceeds to said succeeding one of the two consecutive machine cycles; and updating means connected to said most significant, said first higher, and said least significant parts and said decision circuit for updating said shifted content into an updated content with said sum datum and said partial quotient substituted for parts of said shifted content which are held in said most significant and said first higher parts and in said least significant part, respectively, said updated content serving as the current content during the last period of said succeeding one of the two consecutive machine cycles.

2. A dividing circuit as claimed in claim 1, said shift register including a lower part which includes said least significant part and is other than said most significant and said first and said second higher parts, said dividing circuit further comprising:

digit number calculating means supplied with said dividend and said divisor for calculating a quotient digit number of an eventual quotient which should be calculated together with an eventual residue; and quotient producing means connected to said lower part and said digit number calculating means for producing said eventual quotient when the machine cycles become equal in number to said quotient digit number.

3. A dividing circuit as claimed in claim 2, wherein:

said decision circuit uses said set of algebraic sums in furthermore calculating a carry datum of one m-ary digit;

said dividing circuit further comprising renewing means connected to said carry register and said decision circuit for renewing the memorized carry by said carry datum in each machine cycle.

4. A dividing circuit as claimed in claim 3, further comprising:

a residue adder connected to said carry register, said most significant and said first higher parts, and said digit number calculating means for adding the memorized carry and the upper part of the updated content to produce a provisional residue when the machine cycles become equal in number to said quotient digit number; and a digit shifter connected to said residue adder for one m-ary digit shifting said provisional residue towards its least significant digit to produce said eventual residue.

5. A dividing circuit as claimed in claim 1, wherein said sum calculating means comprises:

a divisor register connected to said digit aligner for memorizing said modified divisor;

a multiple generator connected to said divisor register for producing generator outputs consisting of said modified divisor and $2^n$ times said modified divisor, where n is variable between zero and said decimal integer, both inclusive; and a carry save adder tree connected to said most significant and said first and said second higher parts, said carry register, and said multiple generator for calculating said set of algebraic sums.

6. A dividing circuit as claimed in claim 5, wherein:

said carry save adder tree comprises zeroth through $(m-1)$-th carry save adder branches connected to said most significant and said first and said second higher parts, said carry register, and said multiple generator for calculating zeroth through $(m-1)$-th algebraic sums, respectively, said zeroth through said $(m-1)$-th algebraic sums being the algebraic sums of said set and equal to the upper part of the current content in each machine cycle minus products of said modified divisor and zero through $(m-1)$ plus the memorized carry in said each machine cycle, said zeroth sum being always a non-negative sum which is not negative;

said decision circuit being connected to said zeroth through said $(m-1)$-th carry save adder branches and using said zeroth through said $(m-1)$-th algebraic sums in selecting at least one non-negative sum to decide said partial quotient and said sum datum during the leading period of said succeeding one of the two consecutive machine cycles.

* * * * *